Feb. 22, 1955      P. W. BUECHLER      2,702,383

STAPLER

Filed Feb. 16, 1949      3 Sheets-Sheet 1

INVENTOR.
Paul W. Buechler
BY
ATTORNEYS.

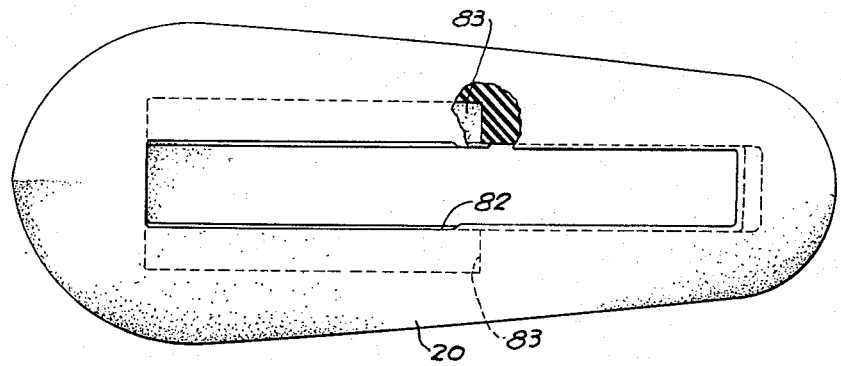
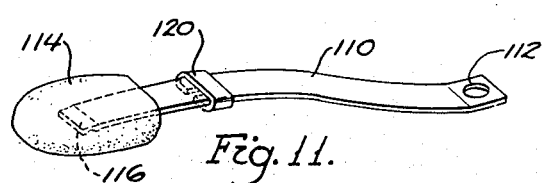
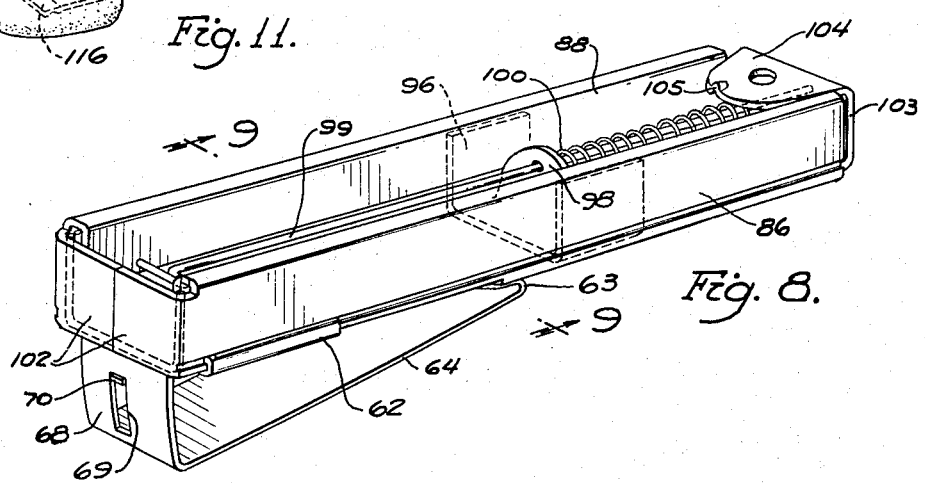
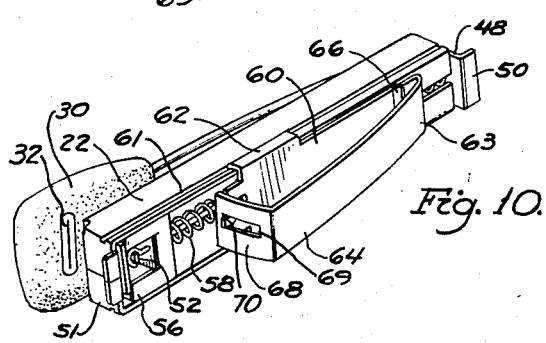
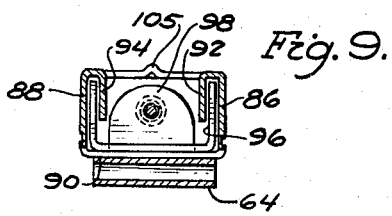

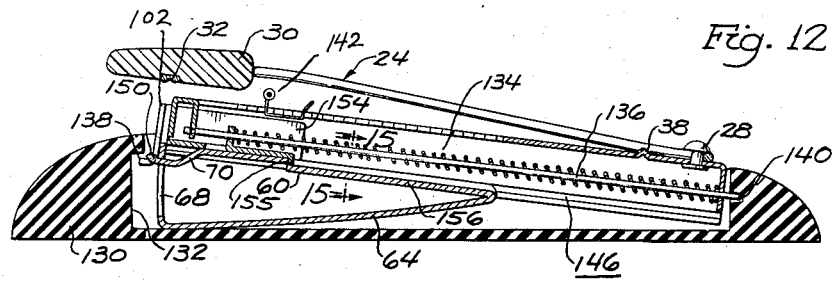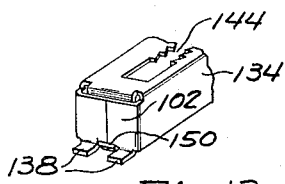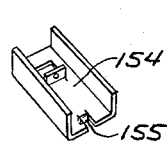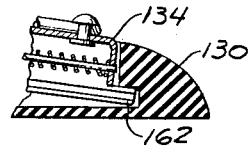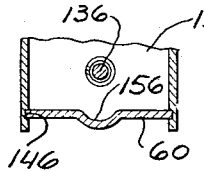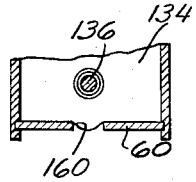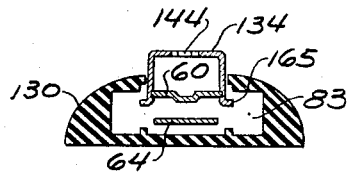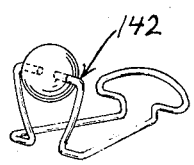

United States Patent Office 2,702,383
Patented Feb. 22, 1955

2,702,383

STAPLER

Paul W. Buechler, Detroit, Mich., assignor to Speed Products Company, Inc., New York, N. Y., a corporation of New York Application February 16, 1949, Serial No. 76,776

4 Claims. (Cl. 1—3)

This invention relates to a stapler of the type commonly used on desks in offices or homes or in various commercial establishments to fasten papers together or tack thin elements together.

It is an object of the present invention to provide a stapler which may be manufactured very inexpensively and which has a number of operation and construction features which make it an improved device for the art.

Primarily, it is an object of the invention to provide a stapler in which the over-all height is considerably lowered from conventional constructions and in which the stapler is inserted in inverted position.

A further object is the provision of a stapler in which the anvil is the striking or operating member.

Another object is the provision of a stapler which is readily adapted to easy loading and in which the actuator member serves as a retractor for the spring as well as to open the loading aperture.

Another object is the provision of a stapling construction which may be mounted in a resilient housing in which there is provided staple storage chambers.

Another object of the invention is the provision of a stapler feed chamber which can be formed simply from a single sheet of metal folded to provide a proper staple guide and feed chamber.

Other objects and features of the invention will be apparent in the following description and claims.

Drawings accompany the specification and the various views thereof may be briefly described as follows:

Figure 1, a perspective view of the stapler in assembled position.

Figure 2, a vertical longitudinal section.

Figure 3, a vertical section on line 3—3 of Fig. 2.

Figure 4, a vertical section on line 4—4 of Fig. 2.

Figure 5, a partial vertical section on line 5—5 of Figure 2.

Figure 6, a view of a paper stop.

Figure 7, a view of the bottom of the base of the stapler housing.

Figure 8, a modified construction for the feed chamber of the stapler.

Figure 9, a sectional view on line 9—9 of Fig. 8.

Figure 10 illustrates the mechanism of Figure 2 with the staple ejector retracted to loading position of the feed chamber.

Figure 11 is a perspective view of a modified type of anvil striker.

Figure 1:
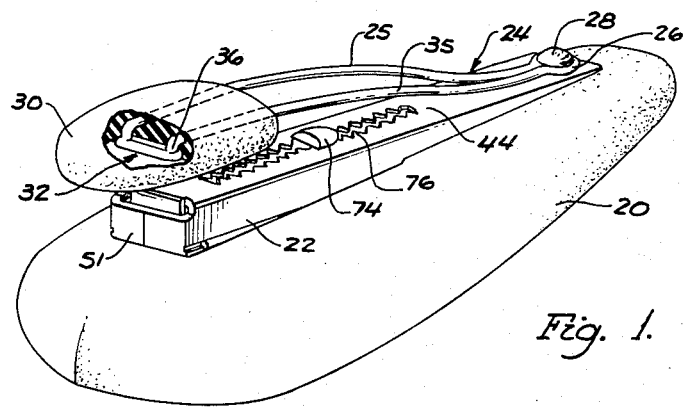

Figure 12, a longitudinal sectional view of a modified form of the invention.

Figure 13, a partial perspective view of the forward end of the embodiment of Fig. 12.

Figure 14, a view of the modified staple projector of Fig. 12.

Figure 15, a sectional view on line 15—15 of Fig. 12.

Figure 16, an alternative bottom section comparable to Fig. 15.

Figure 17, an alternative body shape for retaining purpose.

Figure 18, a modified sectional view showing a manner of holding the stapler body in the base.

Figures 19 and 20, perspective views of paper margin stops.

The stapling device consists mainly of a decorative and functional base 20 which holds a feed chamber housing 22 having a suitable resilient projector therein which will be described in detail later. On the housing 22 is a resilient arm 24 formed of wire which is looped at 26 and fastened by a rivet 28 to the housing. On the arm 24 is a strike pad 30 at the forward end thereof and the arm is embedded in this strike pad except for an anvil end 32 formed by two parallel portions of the arm lying side by side and shaped to form the anvil pocket. These parallel portions forming the anvil 32 constitute a continuation of the one side 25 of the resilient arm 24. The one side 35 has an end 36 which is fastened to the loop between the parallel portions forming the anvil.

Figure 2:
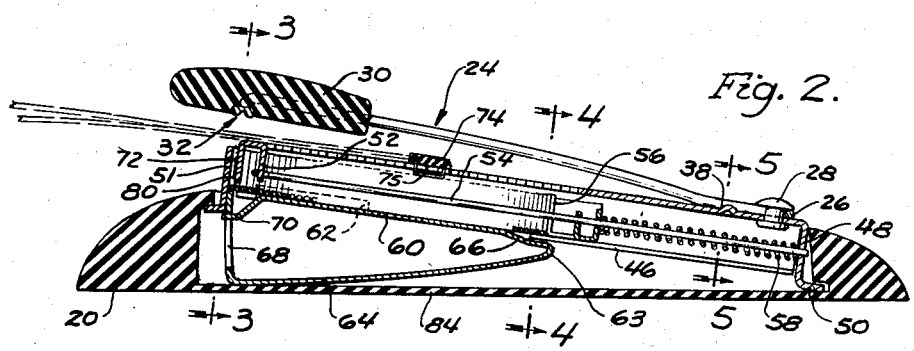
Figures 3, 4, 5:
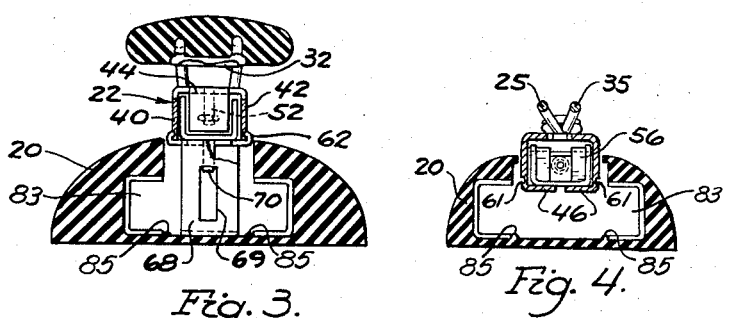

As shown in Figures 2 and 5, a small projection 38 is struck into the upper surface of the feed chamber 22 to catch between the arms 25 and 35 and hold the resilient arm 34 in striking poistion unless it is intentionally moved from such position around the pivot 28 which is on an axis parallel to the stapling action of the unit.

The feed chamber 22 of the unit is preferably formed of a single piece of sheet metal which as shown especially in Figures 1, 2 and 3 has a U-shaped cross-section with sides 40 and 42 connected by a top 44. The sides 40—42 extend around and form a bottom 46 for the channel at the aft end of the feed chamber which is closed by a folded tab 48 having a toe portion 50. The fore end of the feed chamber is closed by continuation of the side members in a head end 51.

A small tab 52 struck down from top plate 44 at the fore end of the feed chamber is connected to the tab 48 by a guide wire 54 for the staple pusher or feed member 56 urged forward by a spring 58 surrounding the guide wire 54.

The bottom of the feed chamber at the fore end is open to serve as a loading aperture. This aperture is closed by a plate 60 (Figure 10) which is slidable on the feed chamber by reason of slides 62 formed on the side of the plate 60 and cooperating with grooves 61 (Figure 4) cut or coined in the outside surface of sides 40 and 42 of the feed chamber. These grooves permit the member 60 to be shifted back to open the loading aperture of the feed chamber. The member 60 preferably forms one leg of a V-shaped member having an apex 63 and another leg 64. There is a slight jog 66 in the leg 60 and the material is resilient so that the off-set or jog portion serves to hold the plate 60 in its position shown in Figure 2 unless it be retracted as shown in Figure 10.

The leg 64 is intended to rest at the forward portion thereof on a supporting surface for the stapler, such as the bottom web 84 of the base 20, and is continued in a closing flap 68 which also serves as the ejector blade or driver for the staples. A slot 69 is cut in the driver blade 68 to cooperate with a tab end 70 of leg 60, limiting the opening movement of the U-member. When in the position shown in Figure 2, it will be seen that the driver blade lies in contact with the head end 51 at the top of which is an ejection slot 72 positioned directly below the anvil 32.

Figure 6:
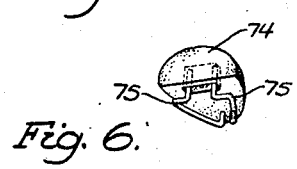

In operation paper is inserted between the striking pad 30 and the feed chamber and it may be located by a small button 74 having spring-like projections 75 on each side, see Figure 6, which cooperate with notches in the sides of a slot 76 in the top 44 of the feed chamber. This slide 74 is adjustable as will be evident from the construction. When pressure is applied to the pad 30 it is transmitted through the housing to the member 64 which resting on the table or other supporting surface forces the staple driver 68 through the feed chamber against the base of the staple 80 causing a stapling action to take place. The inherent resilience of the V-member formed at leg members 60—64 causes a retraction of the blade 68 and, of course, the arm 24 is resilient so that the pad 30 always returns to its position as shown in Figure 2.

The entire mechanism shown in Figure 2 is readily removable from the base 20 since the base is preferably formed of a distortable material of plastic or rubber. The side tabs 62 serve to hold the unit within the rubber base together with the toe 50. On either side of a main chamber 82 in the base 20 are formed storage chambers 83 for staple blocks which consists of a plurality of staples stuck together by some tacky material commonly in use today. A bottom web 84 closes the chamber 82 to provide a protective pad on the supporting surface. Ridges 85 extend along the web 84 at the edge of chamber 82 to hold stored staple blocks in place. The chamber 82 receives the body of the stapler as shown in Figures 1 and 2. When it is desired to load the stapler, the entire mechanism is removed from the base 20 and the driver blade 68 may be projected into the stapling housing a sufficient distance to catch the staple pusher or feed member 56 and is then shifted to the rear carrying with it the pusher 56. As it is shifted back it opens the loading aperture in the fore portion of the chamber and permits a new series of staples to be inserted. The plate 60 is then moved forward to the position shown in Figure 2 and it closes the aperture and supports the staples throughout its length rendering the device ready for use. The device can then be re-inserted in the base and used conventionally. The position of the parts in loading relation is shown in Figure 10 except that the pusher 56 has not been retracted. If it is desired to use the unit as a tacker, the arm 24 may be shifted on the pivot 28 away from the ejection slot and pressure can be applied on the member 64 to cause staples to leave the unit as desired.

A modified type of feed chamber is shown in Figure 8 wherein a single piece of metal is formed to provide two side channels 86 and 88 connected by a base 90. Side channels 86 and 88 are formed around so that inside walls 92 and 94 provide continuous slots the length of the storage magazine to receive and guide the legs of the staples stored within the feed chamber.

A U-shaped staple pusher member 96 has legs which project into the slots between the walls of the feed chamber and a center tab 98 which moves between the legs of the channel on a spring guide 99 positioned at either end of the channel. A spring 100 provides the feeding force. The fore end of the feed chamber is closed by tabs 102 which form the head end of the chamber. The other end of the chamber is formed up at 103 and a tab 104 extends along the channel to provide a support for the pivot 28 mounting the anvil arm 24. At the forward curve of 104 is a struck up portion 105 serving to lock the anvil arm in its stapling position.

The features of the feed chamber are the same as those previously described in the modifications shown in Figure 2 and the general operation of loading and stapling is the same.

In Figure 11, I have shown a modified type of anvil arm 110 formed of a flat piece of spring steel, one end apertured at 112 for the pivot 28, and the other end embedded in a hand pad 114. An anvil 116 is formed in an exposed portion of the arm under the pad 114. The anvil could be separately formed and attached to the arm 110 if desired. A paper edge marker 120 is slidably mounted on arm 110 so that it may be adjusted to any desired position.

In Figure 12, a modified construction is shown wherein a base 130 having a cavity 132 receives the feed chamber housing 134 from which projects a guide wire 136 at one end and a pair of tabs 138 at the other end. Wire 136 projects into recess 140 while tabs 138 project into a re-entrant portion of cavity 132 to be held in place unless the base housing is distorted for removal.

The anvil head 32 may be fastened to housing 134 in the same manner as described of Fig. 2. A paper stop 142 is adjustable in a slot 144 having serrated edges. The paper stop may take the form shown in Fig. 19 or in Fig. 20.

In this embodiment of Fig. 12, the slide 60 is composed of the one-piece spring with driver blade 68 and slides in inside slots 146 of (Fig. 15) the side walls of housing 134. The tab 70 is extended at 150 to clip over the fore wall 102 of housing 134 to hold the slide in place when operating.

Staple pusher or feeder 154 sliding on wire 136 has a small downwardly projecting tab 155 which feeds into groove 156 of slide 60 as the staples reach exhaustion. Thus when slide 60 is retracted to loading position, the feeder slide will also be retracted. As shown in Fig. 12, the unit is empty and the slide 60 when retracted will move feeder 154 back to permit loading.

Figure 16 shows slide member 60 slotted at 160 as an alternative to grooving to retract the staple pusher. Fig. 17 illustrates a modified tail construction in which a projection 162 enters a receiving recess to hold the parts in the base 130. Fig. 18 illustrates another manner of holding the parts assembled, namely, by providing outwardly extending flanges 165 which lie under the edges of the recess in the housing 130.

What I claim is:

1. In a stapling device, an anvil, said anvil comprising a double wire arm having a bight portion supported on a vertical pivot at one end, said arm being formed at the other end with two portions lying transversely of the arm, and means bridging said portions and provided with staple clinching means thereon and formed with an anvil pocket therebetween.

2. A stapling device as described in claim 1 in which the double wire arm is pivoted for movement on the vertical pivot and means is provided to removably locate said arm in stapling position said means comprising a projection received between the portions of the arm, the resilience of the arm permitting motion of the arm away from stapling position.

3. A stapling device comprising a stapling mechanism, a resilient housing surrounding said mechanism whereby the mechanism may be removed from the housing by distorting the housing, and storage compartments formed in said housing available from the inside thereof shaped to receive blocks of staples, and means integral with said housing and extending along said storage compartments to retain said blocks within the storage compartments.

4. A stapling device, comprising; an elongated staple receiving U-shaped magazine having a front wall and spaced sides and having a bottom wall provided with a staple ejecting slot, a staple driving blade adapted to enter said slot; said blade defining a closed substantially V-shaped arrangement embodying a plate for opening or closing at least a part of said housing, and retractor and actuator spring means for said driving blade; said blade depending from said spring means and spanning the front ends of said plate and actuator spring means, said walls embodying spaced grooves for slidably guiding said plate, said plate having an extension, said blade including an opening to receive and guide said extension and to limit separation of said actuator spring means away from said plate, and a locking tab projecting from said extension and cooperating to removably interlock with said front wall to hold said arrangement against bodily displacement relative to said magazine.

References Cited in the file of this patent

UNITED STATES PATENTS

| | | |
|---|---|---|
| 2,281,198 | Maynard | Apr. 28, 1942 |
| 2,296,574 | Rodgers | Sept. 22, 1942 |
| 2,340,717 | Vogel | Feb. 1, 1944 |
| 2,343,203 | Pankonin | Feb. 29, 1944 |
| 2,343,932 | Ruskins | Mar. 14, 1944 |
| 2,358,317 | Crosby | Sept. 19, 1944 |
| 2,358,463 | Masters | Sept. 19, 1944 |
| 2,499,843 | Berger | Mar. 7, 1950 |

FOREIGN PATENTS

| | | |
|---|---|---|
| 671,968 | Germany | Feb. 17, 1939 |